(12) United States Patent
Mandziy et al.

(10) Patent No.: US 12,510,682 B2
(45) Date of Patent: Dec. 30, 2025

(54) PRECISE PROXIMITY OBJECT DETECTION FOR CAPACITIVE SENSING

(71) Applicant: Cypress Semiconductor Corporation, San Jose, CA (US)

(72) Inventors: Vasyl Mandziy, Schyrets (UA); Andriy Maharyta, Lviv (UA); Oleksandr Karpin, Lviv (UA); Mykhaylo Krekhovetskyy, Lviv (UA); Mark Healy, Cork (IE)

(73) Assignee: Cypress Semiconductor Corporation, San Jose, CA (US)

( * ) Notice: Subject to any disclaimer, the term of this patent is extended or adjusted under 35 U.S.C. 154(b) by 291 days.

(21) Appl. No.: 18/463,896

(22) Filed: Sep. 8, 2023

(65) Prior Publication Data

US 2025/0085448 A1 Mar. 13, 2025

(51) Int. Cl.
*G01V 3/08* (2006.01)
*G01V 3/38* (2006.01)

(52) U.S. Cl.
CPC .............. *G01V 3/088* (2013.01); *G01V 3/38* (2013.01)

(58) Field of Classification Search
CPC ................................ G01V 3/38; G01V 3/088
USPC ........................................................ 324/200
See application file for complete search history.

(56) References Cited

U.S. PATENT DOCUMENTS

| | | | | |
|---|---|---|---|---|
| 3,694,741 A * | 9/1972 | Abbe | ..... | G01R 27/02 324/123 R |
| 3,795,861 A * | 3/1974 | Lazenby | ..... | G01V 3/38 324/330 |
| 6,590,401 B1 * | 7/2003 | Hildebrandt | ..... | G01V 3/088 324/680 |
| 6,937,190 B1 * | 8/2005 | Jackson | ..... | G01V 3/082 324/344 |
| 2007/0075890 A1 * | 4/2007 | Jackson | ..... | G01V 3/082 342/22 |
| 2013/0311130 A1 * | 11/2013 | Horton | ..... | F01D 17/02 702/150 |
| 2018/0329103 A1 * | 11/2018 | Colombo | ..... | G01V 3/082 |
| 2021/0371000 A1 * | 12/2021 | Nozoe | ..... | G01V 3/06 |

* cited by examiner

*Primary Examiner* — Christopher P Mcandrew

(57) ABSTRACT

An integrated circuit includes a capacitive sensing circuit to receive signal values associated with a proximity distance to an object. A pair of low pass filters (LPFs) are coupled in parallel to the capacitive sensing circuit and include a first LPF configured with a low filtering rate and a second LPF configured with high filtering rate that is higher than that of the low filtering rate. Control logic is coupled to the pair of LPFs and estimates the proximity distance based on one or more filtered signal values received from the pair of LPFs. The logic causes the second LPF to filter the signal values while the proximity distance remains unchanged. The logic detects a change in the proximity distance beyond a threshold value. The logic causes the first LPF to filter a subsequent signal value received from the capacitive sensing circuit based on detecting the change.

20 Claims, 9 Drawing Sheets

PRECISE PROXIMITY OBJECT DETECTION FOR CAPACITIVE SENSING

TECHNICAL FIELD

This disclosure relates to wireless devices and, more specifically, to precise proximity object detection for capacitive sensing.

BACKGROUND

Specific absorption rate (SAR) is the rate at which energy is absorbed by a human body when exposed to a radio-frequency (RF) electromagnetic field. Leukemia, brain cancer, infertility, altered immune function, and neurological and developmental impairment are reported effects of RF radiation. Controlling RF emission power in the presence of a human body for electronic devices with electromagnetic radiation sources (such as mobile phones, tablets, notebooks, wearables, monitors, other computing devices) is employed to meet stringent emission regulations criteria and SAR standards.

In some cases, an antenna itself is used as a capacitive sensor and a proximity detection algorithm is employed to detect proximity of an object, particularly a human body. In the presence of a human body, the RF electromagnetic fields can be reduced to meet emission regulations criteria and SAR standards. Some challenges to proximity detection include poor signal-to-noise ratio (SNR) due to antennas being small, large parasitic capacitance, and significant temperature changes that cause unpredictability in being able to precisely detect the presence of an object such as part of the human body.

DETAILED DESCRIPTION

Figure 1:
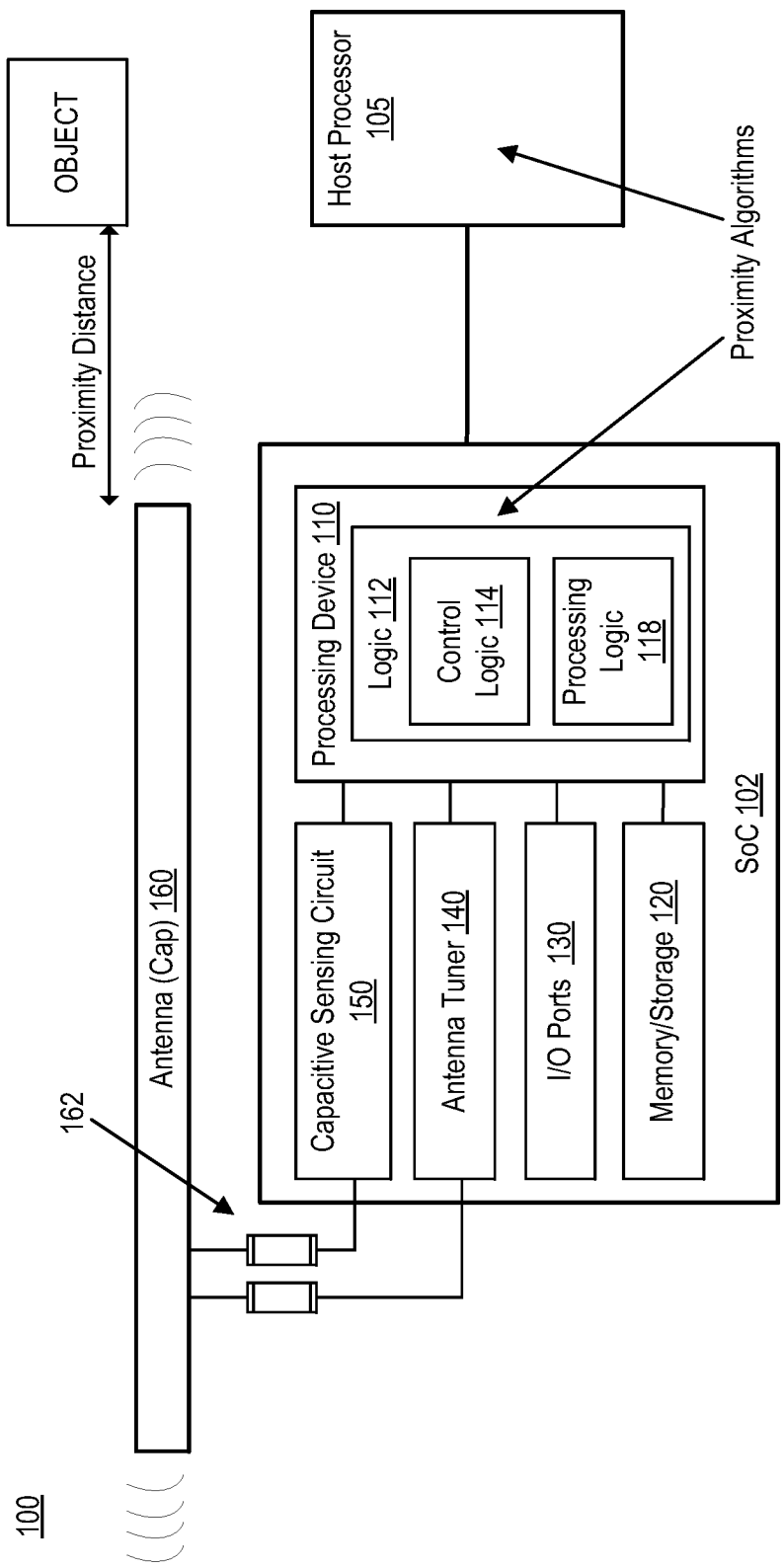
FIG. 1 is a schematic block diagram of an exemplary wireless device configured for precise proximity object detection according to an example embodiment.

The following description sets forth numerous specific details such as examples of specific systems, devices, components, methods, and so forth, in order to provide a good understanding of various embodiments of radio frequency (RF) sensing, particularly with reference to precise proximity object detection for capacitive sensing. Certain wireless devices employ an analog-to-digital converter (ADC) to convert signals data from a capacitive sensor to digital signal values. These digital signal values are then filtered typically through a single low pass filter (LPF) to remove high frequency components, to include system noise and electromagnetic interference, enabling extraction of user activity and slower environmental changes. While these approaches enable a measure of proximity detection, they do not enable a high level of precision in terms of proximity distance detection due to antennas (or other capacitive sensors) being small, large parasitic capacitance, and significant temperature fluctuations from small form factor devices that heat and cool over large temperature ranges.

To resolve these and other deficiencies with known approaches to proximity object detection, the present disclosure teaches use of an advanced LPF, e.g., an ALP filter, that includes a pair of LPFs. In various embodiments, the pair of LPFs are coupled in parallel to a capacitive sensing circuit that receives raw data signal values from a capacitive sensor, which in some embodiments, is an antenna and/or other circuitry within a transceiver of the wireless device. In some embodiments, the pair of LPFs includes a first LPF that has a low filtering rate and a second LPF that has a normal (e.g., high) filtering rate that is higher than that of the low filtering rate. In some embodiments, the first and second LPFs are infinite impulse response (IIR) filters. In some embodiments, the low filtering rate includes no or zero filtering, also referred to herein as bypass filtering.

Further, in at least some embodiments, logic is coupled to the ALP filter and configured to selectively choose which of the first LPF or the second LPF to use depending on detected changes (or rates of changes) to proximity distance. For example, in some embodiments, the logic causes the second LPF to filter the signal values while the proximity distance remains unchanged. The logic may further detect a change in the proximity distance beyond a threshold value, e.g., is thus a sufficiently large change in proximity distance. The logic may further cause the first LPF to filter a subsequent signal value received from the capacitive sensing circuit based on detecting the change, e.g., detecting a proximity distance change that is beyond the threshold value. In this way, when proximity distance is changing quickly, filtering is less precise to allow the rapid change without being slowed down by high-rate filtering. Once the logic estimates that the rate of proximity distance change has dropped below the threshold value, and is thus flattening out, the logic can switch the ALP filter back to filtering the signal values with second LPF having the higher filtering rate. In some embodiments, a recurrent neural network (RNN) model can be trained to act as a recurrent filter for the second LPF to optimize (e.g., increase) SNR when the rate of proximity distance change is less than the threshold value.

The present disclosure includes a number of advantages, including quick reactive filtering in response to significant changes in detected proximity distance, improving the SNR when exposed to extra noise, as well as improvement during periods of less intense proximity distance changes. These and other techniques to be discussed also improve the ability to precisely estimate the proximity distance, even in noisy environments and with exposure to temperature fluctuations. Additional advantages in the below disclosure will be apparent to those skilled in the art of proximity object detection performed by wireless devices.

FIG. 1 is a schematic block diagram of an exemplary wireless device 100 configured for precise proximity object detection according to an example embodiment. In various embodiments, the wireless device includes a system on a chip (SoC) 102 (e.g., an integrated circuit that may be located on a single chip or an integrated set of chips), a host processor 105, and an antenna 160. As discussed, the antenna 160 may be configured to function as a sensing capacitor or the wireless device 100 may include one or more capacitive sensors 162, e.g., coupled between the SoC 102 and the antenna 160. In some embodiments, a sensing capacitor and the antenna 160 are combined to function as the capacitive sensor for sensing raw data signal values indicative of a proximity distance between an object (such as part of a human) and the wireless device 100. In various embodiments, the SoC 102 further includes a processing device 110, a capacitive sensing circuit 150 and antenna tuner 140 coupled between the processing device 110 and the antenna 160, a set of input/output (I/O) ports 130, and memory and/or storage 120.

In various embodiments, the processing device 110 includes logic 112 (including control logic 114 and/or processing logic 118) that performs the signal processing operations discussed herein. For example, the logic 112 may include hardware such as discrete gates and components, programmable logic such as application-specific integrated circuits (ASICS) or field-programmable gate arrays (FPGAs), firmware, or a combination thereof capable of performing the signal processing operations discussed herein of the raw signal values captured by the capacitive sensing circuit 150. In some embodiments, the host processor 105 may execute software and is capable of processing (including the filtering discussed herein) of the raw signal values when received from the SoC 102. In some embodiments, a combination of the processing device 110 and the host processor 105 perform the control and filtering operations discussed herein.

Figure 2:
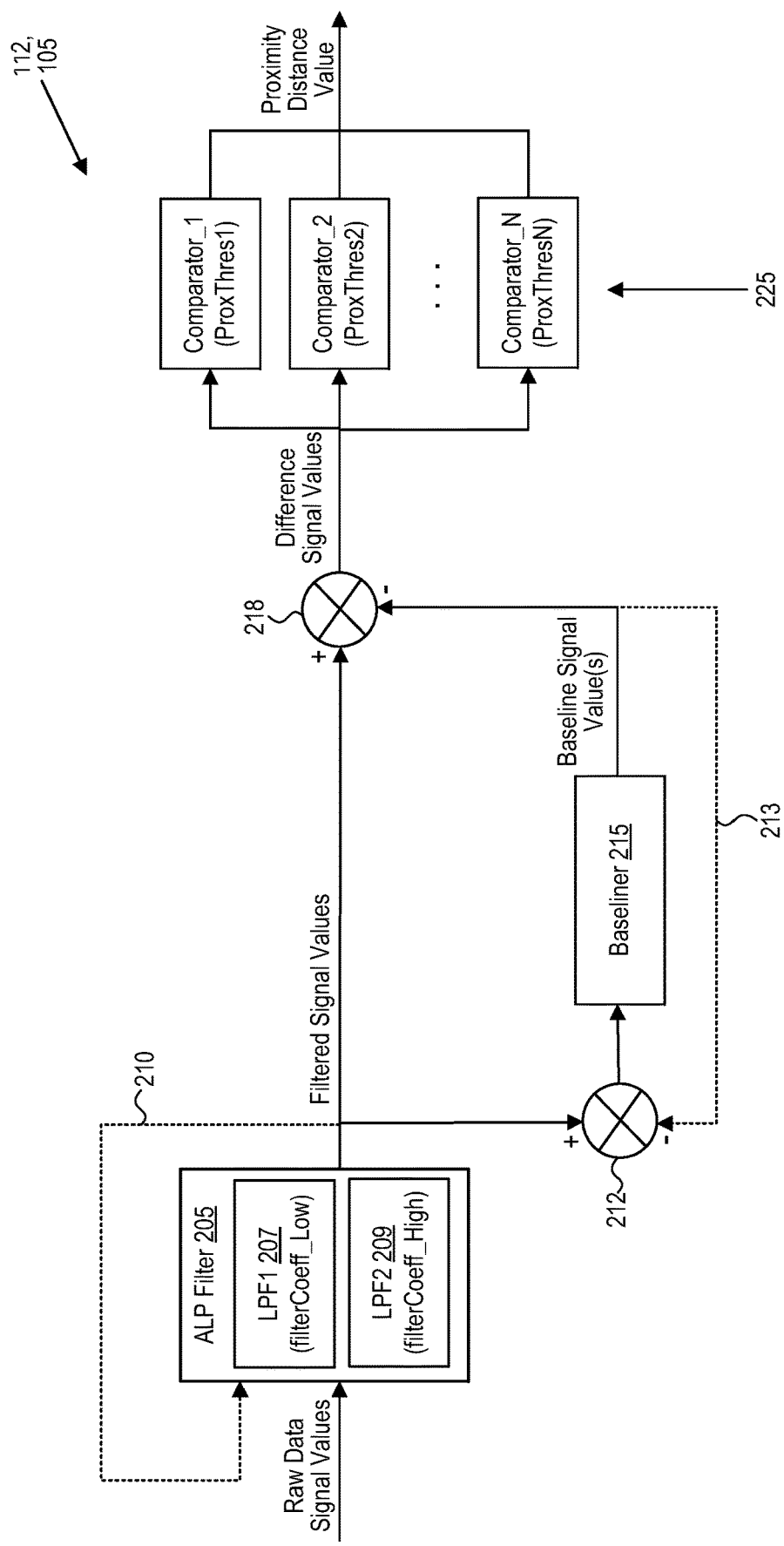
FIG. 2 is a block diagram of an exemplary operational flow diagram of processing SAR signals according to an example embodiment.

FIG. 2 is a block diagram of an exemplary operational flow diagram of processing SAR signals, e.g., by the processing device 110 and/or the host processor 105 according to an example embodiment. The operational flow can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the logic 112 and/or software of the host processor 105 includes an ALP filter 205, a first mixer 212, a second mixer 218, a baseliner circuit 215, and a set of comparators 225.

In some embodiments, the ALP filter 205 includes a first LPF 207 with a low filter coefficient (filterCoeff_low) and a second LPF 209 with a high filter coefficient (filterCoeff_high), e.g., compared to the low filter coefficient of the first LPF 207. A high filter coefficient may be understood to correlate to a high filtering rate while a lower filter coefficient may be understood to correlate to a low filtering rate, particularly in comparison to the higher filtering rate. A lower filtering rate, for example, requires less processing power and can be performed quicker, e.g., to more quickly react to a larger change in proximity distance without a control undershoot in signal processing.

In at least some embodiments, the filtered signal values exit the ALP filter 205 and proceed along two separate paths before being combined. In some embodiments (for at least part of a processing period), the filtered signal values are sent to the baseliner circuit 215 to be baseline processed into at least one baseline signal value. In these embodiments, the baseliner circuit 215 is configured to detect slow variations in the filtered signal values, which are output as one or more baseline signal values of one or more filtered signal values. In various embodiments, one or more known baselining algorithms are employed by the baseliner circuit 215 to set, reset, and update the baseline signal value(s) over time. In some embodiments, there is a single baseline signal value at any given time that can be updated based on processing a continuing changing stream of filtered signal values detected by the capacitive sending circuit.

In some embodiments, the second mixer 218 generates difference signal values by removing the at least one baseline signal value from the one or more filtered signal values (that had exited the ALP filter 205). In this way, the difference signal values exiting the second mixer 218 include substantially only the faster variations of the filtered signal values, which are more relevant for being compared against a set of threshold signal values for proximity distance determination to a human object. For example, in some embodiments, the set of comparators 225 are coupled to the second mixer 218 and configured to determine the proximity distance by comparing a magnitude of the difference signal values to a set of threshold signal levels, e.g., ProxThres1, ProxThres2, . . . ProxThresN.

In some embodiments, at least some of the baseline signal value(s) are fed back to and combined by the first mixer 212 (see dashed line 213), e.g., to remove already detected baseline signal values so that the baseliner circuit 215 can further detect new or different baseline signal values due to the changing noisy environment of the user. Further, in some embodiments, at least some of the filtered signal values are fed back to the ALP filter 205 (see dashed line 210) in order to aid the first LPF 207 and second LPF 209 in further processing the raw data signal values to new filtered signal values.

Figure 3:
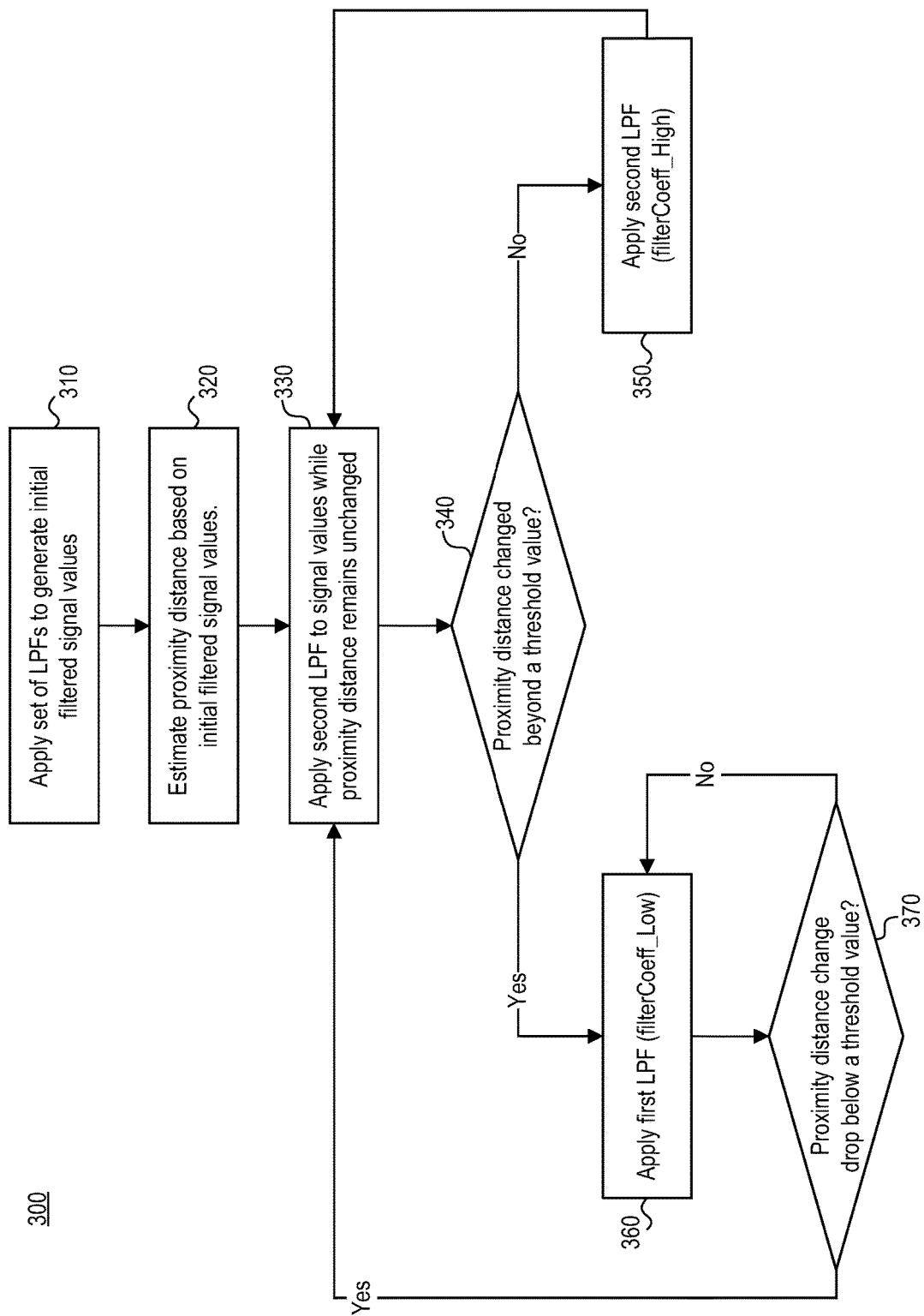
FIG. 3 is a flow diagram of a method of detecting objects using an advanced low pass (ALP) filter and related logic according to an embodiment.

FIG. 3 is a flow diagram of a method 300 of detecting objects using the ALP filter 205 and related logic according to an embodiment. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the wireless device 100, to include the processing device 110 and/or the host processor 105 (FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic applies the set of LPFs (e.g., the ALP filter 205) to the raw data signal values (e.g., "signal values") received from the capacitive sensing circuit 150 to generate filtered signal values. The signal values may be received from, for example, the capacitive sensors 162 and/or antenna 160 and be indicative of the proximity of an object like a human digit or part. In various embodiments, the method 300 employs either the first LPF 207 or the second LPF 209 (or a combination thereof) to initialize filtering of the signal values for purposes of generating an initial estimate of proximity distance.

At operation 320, the processing logic estimates the proximity distance to the object based on one or more filtered signal values receive from the set of LPFs.

At operation 330, the processing logic causes the second LPF 209 of the set of LPFs to filter the signal values while the proximity distance remains unchanged. In other words, if the initial estimate of the proximity distance indicates little change in the proximity distance, the processing logic can resume filtering with the second LPF 209 that is configured with the higher filtering rate. In some embodiments, the second LPF 209 is the default filter to begin initial proximity determination and operation 340 may be performed quickly thereafter, if applicable.

At operation 340, the processing logic determines (e.g., detects) whether the proximity distance has changed beyond a threshold value, e.g., beyond 5, 10, 15, 20 percent change or the like (depending on application of the wireless device 100 or user preference).

At operation 350, in response to detecting the proximity distance not changing beyond the threshold value (e.g., substantially remain unchanged), the processing device continues to apply the second LPF 209.

At operation 360, in response to detecting the proximity distance changing beyond the threshold value, the processing logic causes the first LPF 207 to filter a subsequent signal value received from the capacitive sensing circuit 150. In this way, the processing logic can monitor and transition filtering between the LPFs of the ALP filters 205 depending on the range of change of the proximity distance, enabling efficient, highly responsive filtering that improves SNR of tracking the proximity distance.

At operation 370, the processing logic determines (e.g., detects) whether the proximity distance change drops below the threshold value. If not, the processing logic continues to filter the signal values using the first LFP 207 with the lower filtering rate. If yes, the proximity change drops below the threshold value, the processing logic causes the second LPF 209 to again filter the signal values received from the capacitive sensing circuit 150, e.g., by looping back to operation 330 of the method 300.

Figure 4:
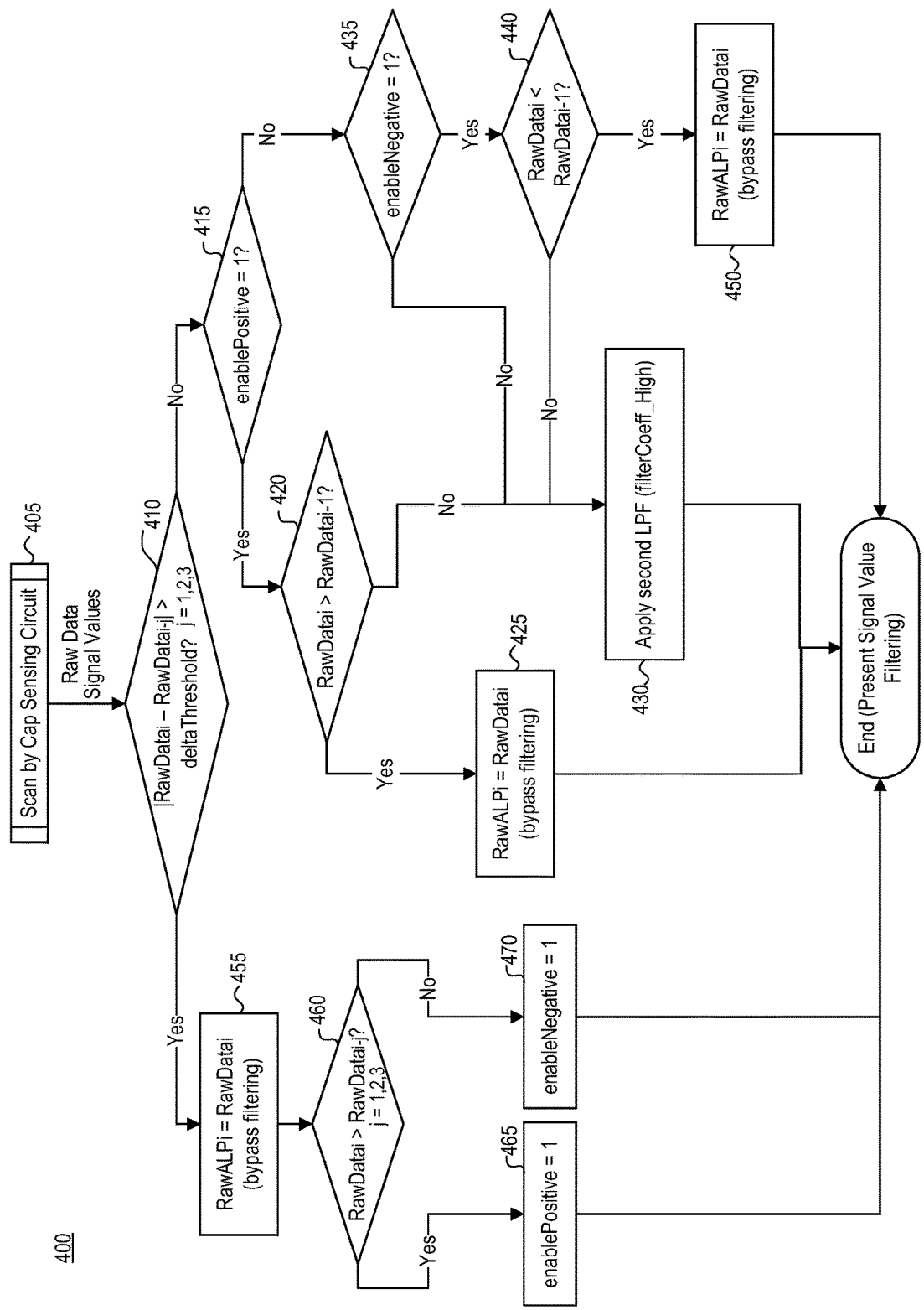
FIG. 4 is a flow diagram of a method of detecting objects using an advanced low pass (ALP) filter and related logic according to additional embodiments.

FIG. 4 is a flow diagram of a method 400 of detecting objects using the ALP and related logic according to additional embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the wireless device 100, to include the processing device 110 and/or the host processor 105 (FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic causes the capacitive sensing circuit 150 to scan signal values received via a sensing capacitor of a capacitive sensing system. In some embodiments, the signal values are associated with a proximity distance to an object. Results of the scanning include raw data signal values, which are more simply referred to as "signal values" herein. In various embodiments, each path through various possible operations of the method 400 is applied to a current signal value and performed again for each sequentially next signal value as the signal values are scanned for and detected by the capacitive sensing circuit 150.

At operation 410, the processing logic determines whether an absolute amplitude difference between a present signal value (i) and one of a set of immediate, previously detected signal values (i−j) is greater than a threshold value. As indicated, j may be selected equal to one, two, or three, primarily to keep the "immediate, previously detected signal values" close in time, but it is envisioned that j could be extended to be four or five as well.

At operation 415, in response to the absolute amplitude difference being less than or equal to the threshold value, the processing logic determines whether an enable positive indicator is asserted. In embodiments, the enable positive indicator is a flag (such as a register value or the like) that indicates the proximity distance is trending positive (e.g., the object is moving closer), which can be set at operation 465.

At operation 420, in response to determining at operation 415 that the enable positive indicator is asserted, the processing logic determines whether an amplitude of the present signal value (i) is greater than that of an immediate, previously detected signal value (i−1).

At operation 425, in response to determining at operation 420 that an amplitude of the present signal value is greater than that of an immediate, previously detected signal value, the processing logic causes the bypass of filtering the present signal value (e.g., $RawALP_i = RawData_i$). As discussed, bypass filtering means that the signal values are not filtered and simply passed to the set of comparators 225 (FIG. 2).

At operation 430, in response to determining at operation 420 that an amplitude of the present signal value is less than or equal to that of an immediate, previously detected signal value, the processing logic causes filtering of the present signal value. In some embodiments, causing filtering at operation 430 includes applying the second LPF 209 with the higher filtering rate. In one embodiment, the second LPF 209 is expressed as Equation (1), although other known or yet to be developed filters are also envisioned.

$$ALP_i = ((\text{irrCoeff} - 1) * RawALP_{i-1} + RawData_i)/\text{irrCoeff} \qquad (1)$$

At operation 435, in response to determining at operation 415 that the enable positive indicator is not asserted, the processing logic determines whether an enable negative indicator is asserted. In embodiments, the enable negative indicator is a flag (such as a register value or the like) that indicates the proximity distance is trending negative (e.g., the object is moving away), which can be set at operation 470.

At operation 440, in response to determining at operation 435 that the enable negative indicator is asserted, the processing logic determines whether an amplitude of the present signal value (i) is less than that of an immediate, previously detected signal value (i−1).

At operation 450, in response to determining at operation 440 that the enable negative indicator is asserted, the processing logic causes the bypass of filtering the present signal value (e.g., $RawALP_i = RawData_i$).

Further at operation 430, in response to determining at operation 435 that the enable negative indicator is not asserted or in response to determining at operation 440 that the amplitude of the present signal value (i) is greater than or equal to that of an immediate, previously detected signal value (i−1), the processing logic causes filtering of the present signal value. In some embodiments, causing filtering at operation 430 includes applying the second LPF 209 with the higher filtering rate.

At operation 455, in response to determining at operation 410 that the absolute amplitude difference between a present signal value (i) and one of a set of immediate, previously detected signal values (i–j) is greater than the threshold value, the processing logic causes a bypass of filtering the present signal value, e.g., to pass an unfiltered present signal value. In at least some embodiments, also at operation 455, the processing logic employs the unfiltered present signal value together with one or more filtered signal values to track the proximity distance to the object, e.g., employing use of the set of comparators 225 to these unfiltered and filtered signal values.

At operation 460, the processing logic determines whether an amplitude of the present signal value (i) is greater than that of the one of the set of immediate, previously detected signal values (i–j). This comparison may be performed to determine whether the proximity distance is trending positive (proximity growing) or negative (proximity lessening).

At operation 465, the processing logic asserts an enable positive indicator in response to the amplitude of the present signal value being greater than that of the one of the set of immediate, previously detected signal values. The asserted positive indicator may be detected during a subsequent pass through the method 400 at operation 415.

At operation 470, the processing signal asserts an enable negative indicator in response to the amplitude of the present signal value being less than or equal to that of the one of the set of immediate, previously detected signal values. The asserted negative indicator may be detected during a subsequent pass through the method 400 at operation 435.

Figure 5:
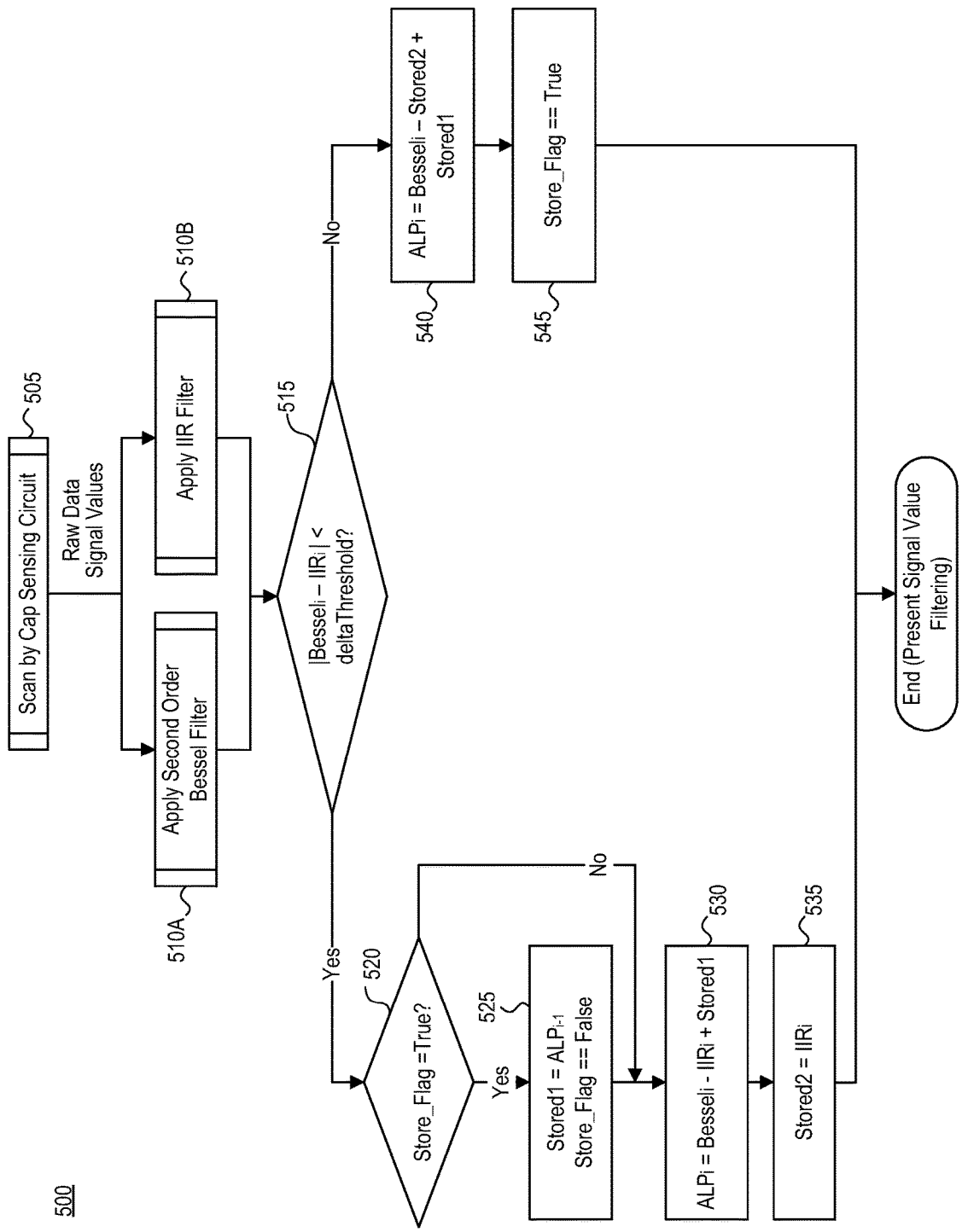
FIG. 5 is a flow diagram of a method of detecting objects using a combination of a second order Bessel filter and an infinite impulse response (IIR) filter and related logic according to some embodiments.

FIG. 5 is a flow diagram of a method 500 of detecting objects using a combination of a second order Bessel filter and an infinite impulse response (IIR) filter and related logic according to some embodiments. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the wireless device 100, to include the processing device 110 and/or the host processor 105 (FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing logic causes the capacitive sensing circuit 150 to scan signal values received via a sensing capacitor of a capacitive sensing system, the signal values associated with a proximity distance to an object. Results of the scanning include raw data signal values, which are more simply referred to as "signal values" herein. In various embodiments, each path through various possible operations of the method 500 is applied to a current signal value and performed again for each sequentially next signal value as the signal values are scanned for and detected by the capacitive sensing circuit 150.

At operation 510A, the processing logic filters the signal values through a second order Bessel filter to generate first filtered signal values (Bessel$_i$ et sequence).

At operation 510B, the processing logic filters the signal values through an infinite impulse response (IIR) filter to generate second filtered signal values (IIR$_i$ et sequence).

Through operations 515-545, which will be discussed in detail, the processing logic selects, for output signal values, between respective ones of the first and second filtered values depending on whether an absolute amplitude difference between each first filtered signal value and a corresponding second filtered signal value is less than a threshold value (deltaThreshold). The processing logic may then employ the output signal values to track the proximity distance to the object. By performing this check (at operation 515) and choosing the best output signal value relative to the "threshold value," an overall best filtered signal can be generated that most quickly reacts to changes in proximity distance and returns to steady-state filtering when the rate of change of proximity distance reduces.

With more specificity, at operation 515, the processing logic determines whether an absolute amplitude difference between each first filtered signal value and a corresponding second filtered signal value is less than a threshold value.

At operation 520, in response to determining at operation 515 that the absolute amplitude difference between each first filtered signal value and a corresponding second filtered signal value is less than the threshold value, the processing logic determines whether a store flag is asserted to indicate an immediate previous signal value is stored (see operation 545).

At operation 525, in response to determining at operation 520 that the store flag is asserted, the processing logic retrieves the immediate previous signal value (e.g., Raw-ALP$_{i-1}$) and deasserts the store flag. The store flag may be deasserted as an indication that the previous signal value has been retrieved and employed in processing, so is no longer needed, for example.

At operation 530, after operation 525 or in response to determining at operation 520 that the store flag is deasserted, the processing logic determines a present signal value (ALP$_i$) as the first filtered signal value (Bessel$_i$) minus the corresponding second filtered signal value (IIR$_i$) plus the immediate previous signal value (Stored1). At operation 545, the processing logic stores the corresponding second filtered value (e.g., as Stored2).

At operation 540, in response to the determining at operation 515 that the absolute amplitude difference between a first filtered signal value and the corresponding second filtered signal value is greater than or equal to the threshold value, the processing logic determines a present signal value (ALP$_i$) as the first filtered signal value (Bessel$_i$) minus the corresponding second filtered value (Stored2) plus an immediate previous signal value (Stored1). At operation 545, the processing logic asserts a store flag to indicate the present signal value (ALP$_i$) has been stored, which them becomes the immediate previous signal value (Stored1) for a subsequent pass through the method 500.

Thus, if operations 515, 540, and 545 were to be performed again after operations 520 through 535 were performed, these operations may be articulated similarly. For example, at operation 515, the processing logic determines that the absolute amplitude difference between a subsequent first filtered signal value and a corresponding subsequent second filtered signal value is greater than or equal to the threshold value (e.g., is subsequent to the "present" signal value). At operation 540, the processing logic determines a subsequent signal value (e.g., $ALP_{i+1}$) as the subsequent first filtered signal value ($Bessel_{i+1}$) minus the corresponding subsequent second filtered value (Stored2) plus the present signal value (Stored1 or $ALP_i$). At operation 545, the processing logic asserts the store flag to indicate the subsequent signal value ($ALP_{i+1}$) has been stored, e.g., as new Stored1 value. In this way, the processing logic may iterate through filtered values and store immediate previously outputs of the first and second filtered values.

Figure 6:
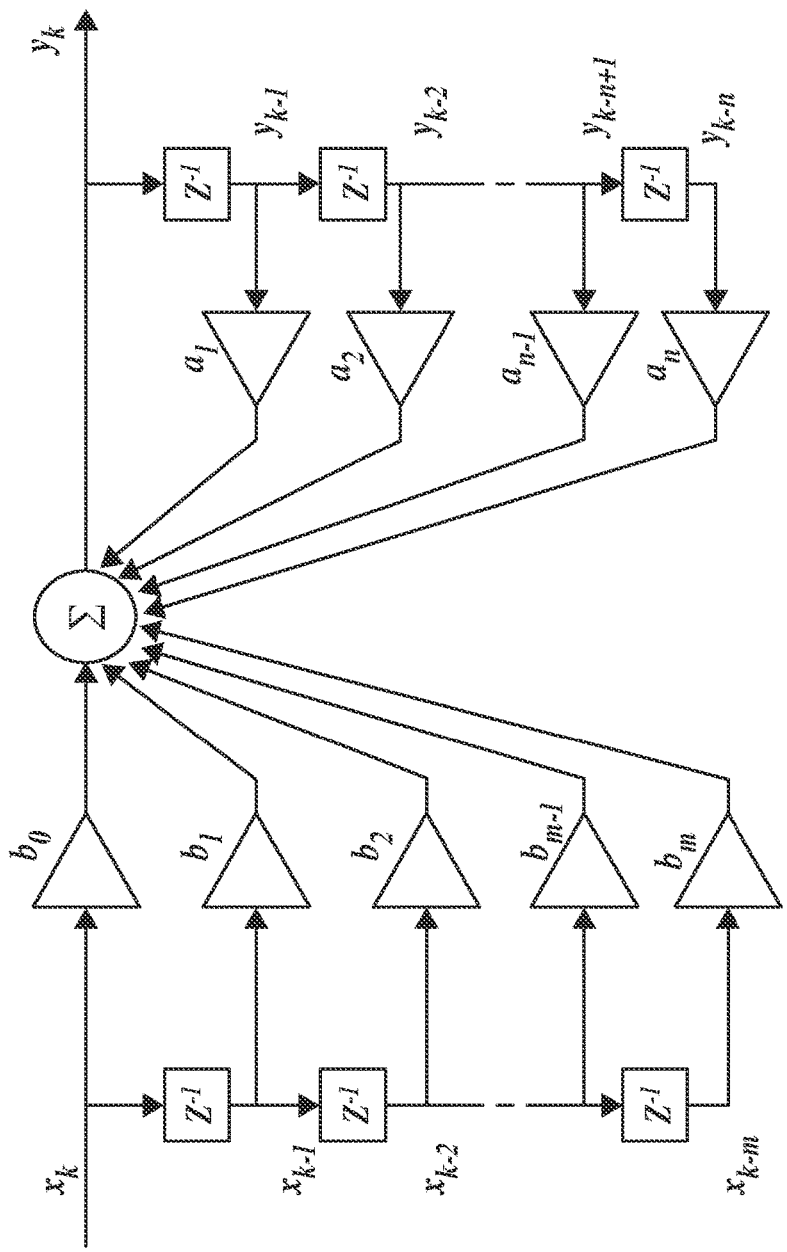
FIG. 6 is a schematic block diagram representing a recursive filter in accordance with some embodiments.

FIG. 6 is a schematic block diagram representing a recursive filter 600 in accordance with some embodiments. In various embodiments, the recursive filter 600 is represented mathematically as $y_k = \sum_{i=0}^{m} b_i \cdot x_{k-i} + \sum_{i=1}^{n} a_i \cdot y_{k-i}$ in which at least one output ($y_k$–$y_{k-n}$), e.g., previously filtered signal values is/are used as an input along with one or more new inputs ($x_k$–$x_{k-m}$), e.g., unfiltered signal values. The summer in the middle indicates, at a general level, how the one or more outputs are integrated within the current output ($y_k$) of the recursive filter 600. In various embodiments, therefore, the inputs and outputs retain maximum flexibility in value and can change during recursively iterating through the recursive filter 600 to generated filtered outputs from the input signal value(s).

Figure 7:
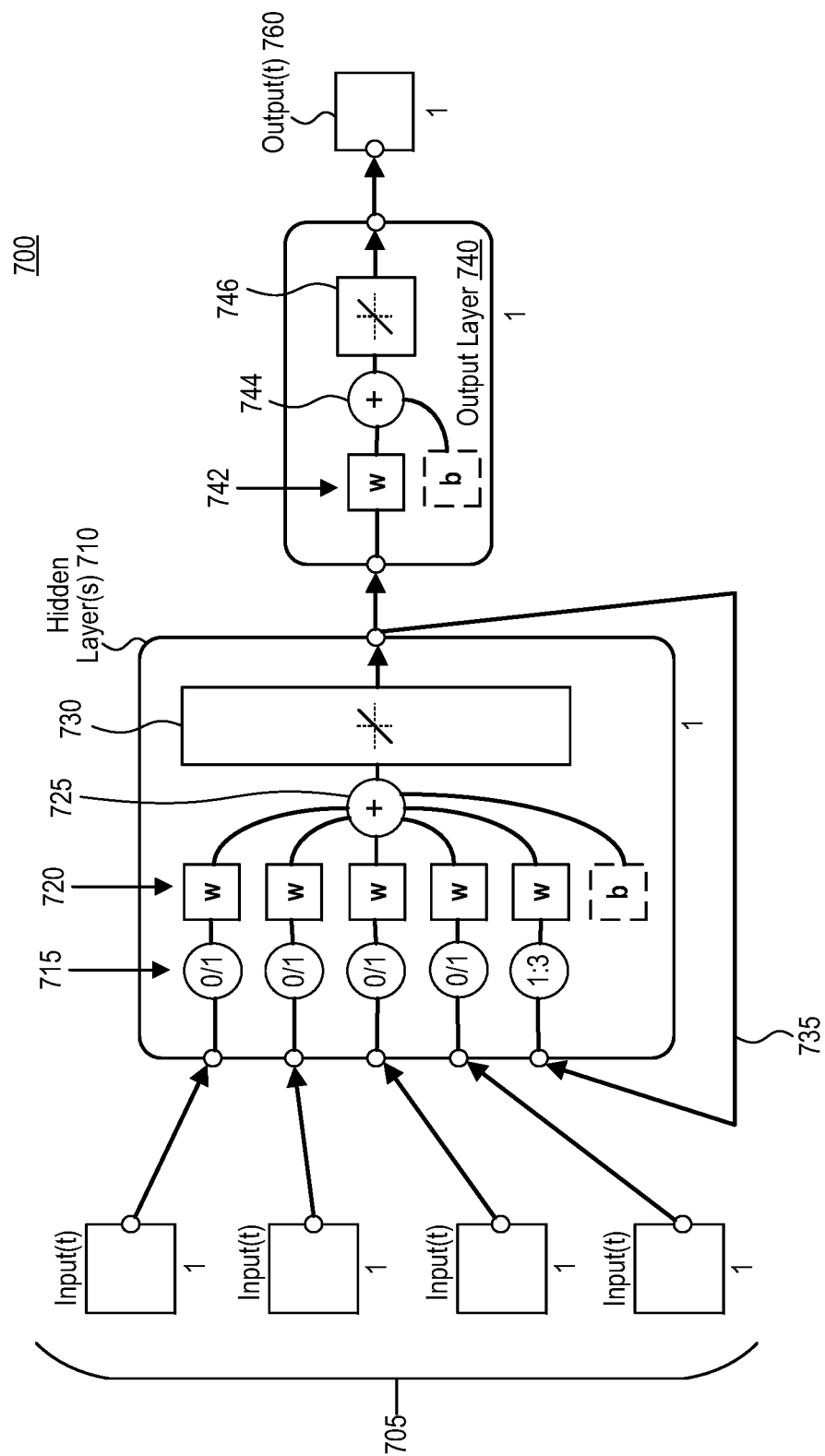
FIG. 7 is a block diagram of an exemplary recurrent neural network (RNN) that can be trained to model the recursive filter in accordance with some embodiments.

FIG. 7 is a block diagram of an exemplary recurrent neural network (RNN) 700 that can be trained to model the recursive filter 600 in accordance with some embodiments. In various embodiments, the RNN 700 acts on one or more inputs values 705, processes the one or more inputs 705 through a set of hidden layers 710, and generates one or more outputs 760. The set of hidden layers 710, for example, may represent a neuron of the RNN 700. Although the RNN 700 of FIG. 7 illustrates modeling a recursive filter with m of three ("3") previously unfiltered signal values and n of three ("3") previously filtered signal values, it can be modified (made smaller or lager) to model recursive filters of various sized inputs. It has been shown that increasing values of m and n does not improve results significantly.

In at least some embodiments, the hidden layers 710 include registers 715 that detect and hold the input values 705 (e.g., whether "0" or "1"), a weight (w) that is applied to respective input values 705, a summer 725 that combines the weighted input values, and an identity activation function 730 that decides an intermediate output value from the set of hidden layers 710 to be further acted upon, e.g., by an output layer 740. In some embodiments, the intermediate output value is fed back (see path 735) into an input of the set of hidden layer 710 to become another weighted input that is combined by the summer 725, thus providing the recursive feedback aspects of the recursive filter 600. In some embodiments, the intermediate output value that is fed back into the set of hidden layers 710 is first multiplied before being weighted. For example, a multiple of the intermediate output value may be performed as a 1-to-2 (1:2), as a 1-to-3 (1:3), or the like multiple before application of a weight 720. In some embodiments, a scalar value (e.g., a "b" value) is also optionally combined by the summer 725 with the other weighted input values.

The output layer 740 may include a further weight 742 to be applied to the intermediate output value, a summer 744 that can combine the optional scalar value (e.g., the "b" value) into a weighted intermediate output value, followed by a second activation layer 746 that generates a final output value 760 for the RNN 700. As the RNN 700 is trained over time, the final output value 760 may be updated depending on how the proximity distance changes. In this way, the logic 112 can employ the RNN 700 (e.g., by training the RNN 700) to automatically design the ALP filter 205 to variably employ different filtering parameters depending on recent proximity distance detection conditions to maximize SNR of the proximity distance value.

Figure 9:
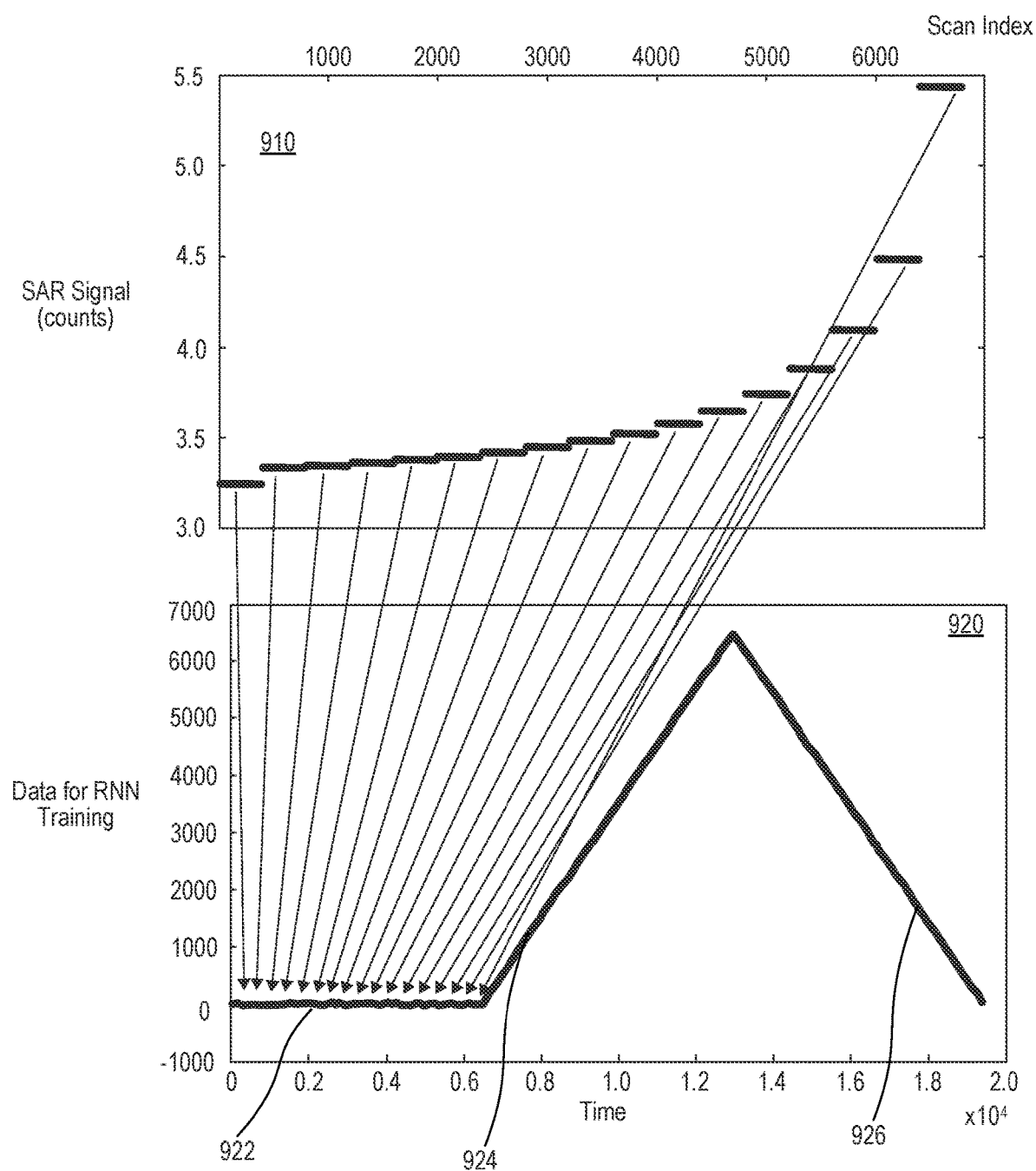
FIG. 9 is a graph illustrating an example for RNN model training as part of employing precise object proximity detection according to some embodiments.

For example, with applicability to previous Figures, according to some embodiments, the logic 112 models the recursive filter 600, which includes at least the pair of LPFs (e.g., the first LPF 207 and the second LPF 209), using a recurrent neural network (RNN) model such as the RNN 700. In these embodiments, the processing logic inputs, to the RNN model, a present unfiltered signal value (e.g., $x_k$) and zero or more previous unfiltered signal values (e.g., any of $x_{k-1}$ to $x_{k-m}$) that had been stored in memory. In these embodiments, the processing logic also inputs, to the RNN model, one or more output (e.g., any of $y_k$ to $y_{k-n}$) of an identity activation function of the RNN model. In these embodiments, the processing logic further trains the RNN model to tune at least one parameter of the recursive filter 600 such as to maximize a signal-to-noise ratio (SNR) of the proximity distance. FIG. 9 will discuss at least one tunable parameter, but others are envisioned.

Figure 8:
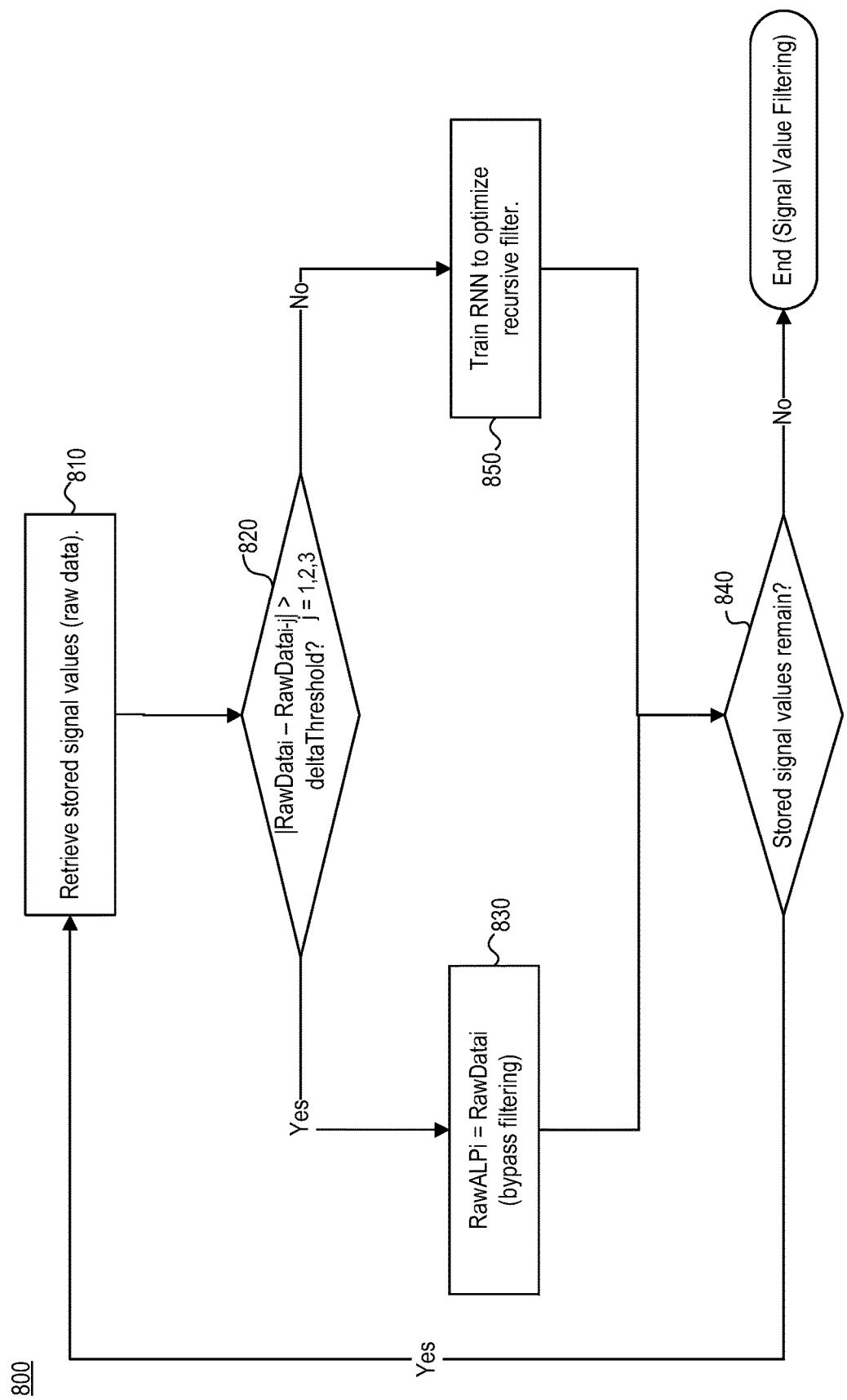
FIG. 8 is a flow diagram of a method of objection detection using the ALP filter and optionally training of the RNN according to various embodiments.

FIG. 8 is a flow diagram of a method 800 of objection detection using the ALP filter 205 and optionally training of the RNN according to various embodiments. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the wireless device 100, to include the processing device 110 and/or the host processor 105 (FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, the processing logic retrieves stored signal values, e.g., the raw data signal values previously discussed. These raw data signal values may represent sampled capacitive sensing data from a capacitive sensor over time as associated with a proximity distance to an object such as a human digital or part.

At operation 820, the processing logic determines whether an absolute amplitude difference between a present signal value (i) and one of a set of immediate, previously detected signal values (i−j) is greater than a threshold value. As indicated, j may be selected equal to one, two, or three, primarily to keep the "immediate, previously detected signal values" close in time, but it is envisioned that j could be extended to be four or five as well.

At operation 830, in response to determining at operation 820 that the absolute amplitude difference between the present signal value and one of the set of immediate, previously detected signal values is greater than the threshold value, the processing logic causes the bypass of filtering the present signal value (e.g., $RawALP_i = RawData_i$). As discussed, bypass filtering can indicate that the signal values are not filtered and simply passed to the set of comparators 225 (FIG. 2).

At operation 840, the processing logic determines whether there remain any stored signal values still to process. If there still remain signal values to process, the method 800 loops back to operation 810 to re-execute the operations of the method 800. Otherwise, the method terminates signal value filtering for the stored signal values.

At operation 850, in response to determining at operation 820 that the absolute amplitude difference between the present signal value and one of the set of immediate, previously detected signal values is less than or equal to the threshold value, the processing logic trains the RNN 700 to optimize the recursive filter 600. As discussed with reference to FIG. 7, the optimization of the recursive filter includes maximizes the SNR of the proximity distance values that are output from the recursive filter 600 over time. In some embodiments, the RNN model is initialized with the latest bypassed signal values received from the ALP filter 205, as performed in operation 830.

FIG. 9 is a graph illustrating an example for RNN model training as part of employing precise object proximity detection according to some embodiments. A top section 910 of the graph illustrates an example of a SAR signal and SNR for different proximity distances, generally starting at 16 millimeters (mm) close to 3.2 SAR signal count all the way up to 1 mm at close to 5.5 SAR signal count. With such data, one can calculate SNR for each step in proximity distance change (e.g., 16 mm to 15 mm, 15 mm to 14 mm, and so forth). In some embodiments, one can also calculate noise in each proximity detection range, then calculate a signal magnitude difference (e.g., between 15-16 mm). From these calculations, one can determine the SNR at different proximity detection distances and for each proximity difference change. Further, using these calculations, the ALP filter 205 can be designed to improve SNR for high distances (e.g., 12 mm+ or the like) away from the capacitive sensor 162 and/or 160.

A bottom section 920 of the graph illustrates a mapping of flat zones from the data collected in the top section 910 of the graph. In some embodiments, the RNN model filters SAR data only when the proximity distance does not change, e.g., in these "flat zones." By collecting data for the "flat zones" and subtracting the average value from every "flat zone," leaves a signal of varying levels of noise near a zero ("0") amplitude, which is illustrated in a first third 922 of the plot in the bottom section 920.

In at least some embodiments, the trained RNN 700 filters the signals drift from the temperature changes and other external factors. Accordingly, in these embodiments, a tunable drift parameter (which is measured in counts/scan) is added to the RNN 700 that is responsible for signal changes based on temperature changes/external factors. A second third 924 of the plot in the bottom section 920 is equal to the first third 922, but with the added signal drift, which is 0.3 in this particular example embodiment. A last third 926 of the plot in the bottom section 920 emulates the drift in the opposite direction, e.g., due to opposite temperature changes or opposite external factors. In this way, the RNN 700 emulates a desired output along with this tunable drift parameter factored into the trained RNN model.

In one exemplary embodiments, taken from experiments, Table 1 illustrates SNRs for stepping from 16 mm to 15 mm proximity distance from an object for different RNN configurations when the drift parameter value is selected as 0.3. As can be seen, the SNR can be maximized at 2.87 with m selected as one ("1") and n selected as two ("2").

TABLE 1

| | | n | | | |
|---|---|---|---|---|---|
| | | 1 | 2 | 3 | 4 |
| m | 0 | 2.18 | 2.34 | 2.35 | — |
| | 1 | 2.65 | 2.87 | — | — |
| | 2 | 2.7 | 2.69 | — | — |
| | 3 | 2.57 | 2.66 | 0.65 | — |

In one exemplary embodiments, taken from experiments, Table 2 illustrates SNRs for stepping from 16 mm to 15 mm proximity distance from an object for different RNN configurations when the drift parameter value is selected as 1.0. As can be seen, the SNR can be maximized at 1.91 with m selected as one ("1") and n selected as one ("1") as well.

TABLE 2

| | | n | | | |
|---|---|---|---|---|---|
| | | 1 | 2 | 3 | 4 |
| m | 0 | 1.8 | 1.83 | 1.87 | — |
| | 1 | 1.91 | 1.89 | — | — |
| | 2 | 1.91 | 1.84 | — | — |
| | 3 | 1.9 | 1.4 | 0.25 | — |

It will be apparent to one skilled in the art that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for object proximity detection described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the disclosure has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. An integrated circuit comprising:
   a capacitive sensing circuit to receive signal values associated with a proximity distance to an object;
   a pair of low pass filters (LPFs) coupled in parallel to the capacitive sensing circuit, the pair of LPFs comprising:
     a first LPF configured with a low filtering rate; and
     a second LPF configured with a high filtering rate that is higher than that of the low filtering rate; and
   logic coupled to the pair of LPFs, the logic to:
     estimate the proximity distance based on one or more filtered signal values received from the pair of LPFs;
     cause the second LPF to filter the signal values while the proximity distance remains unchanged;
     detect a change in the proximity distance beyond a threshold value; and
     cause the first LPF to filter a subsequent signal value received from the capacitive sensing circuit based on detecting the change.

2. The integrated circuit of claim 1, wherein each of the first LPF and the second LPF is an infinite impulse response (IIR) filter.

3. The integrated circuit of claim 1, wherein the low filtering rate is zero filtering.

4. The integrated circuit of claim 1, wherein the logic is further to:
   estimate the proximity distance has dropped under the threshold value; and
   cause the second LPF to again filter the signal values received from the capacitive sensing circuit.

5. The integrated circuit of claim 1, further comprising an antenna coupled to the capacitive sensing circuit, the antenna configured to function as a capacitor for capacitive sensing.

6. The integrated circuit of claim 1, wherein the logic comprises:
   a baseliner circuit coupled to the pair of LPFs, the baseliner circuit to determine at least one baseline signal value of the one or more filtered signal values;
   a mixer to generate difference signal values by removing the at least one baseline signal value from the one or more filtered signal values; and
   a set of comparators coupled to the mixer, the set of comparators to determine the proximity distance by comparing a magnitude of the difference signal values to a set of threshold signal levels.

7. The integrated circuit of claim 1, wherein the logic is further to:
   model a recursive filter, which includes at least the pair of LPFs, using a recurrent neural network (RNN) model;
   input, to the RNN model, a present unfiltered signal value and zero or more previous unfiltered signal values that had been stored in memory;
   input, to the RNN model, one or more output of an identity activation function of the RNN model; and
   train the RNN model to tune at least one parameter of the recursive filter such as to maximize a signal-to-noise ratio (SNR) of the proximity distance.

8. A method comprising:
   causing a capacitive sensing circuit to scan for signal values received via a sensing capacitor of a capacitive sensing system, the signal values associated with a proximity distance to an object;
   determining, by processing logic of the capacitive sensing system, whether an absolute amplitude difference between a present signal value and one of a set of immediate, previously detected signal values is greater than a threshold value;
   causing, in response to the absolute amplitude difference being greater than the threshold value, a bypass of filtering the present signal value to pass an unfiltered present signal value; and
   employing the unfiltered present signal value together with one or more filtered signal values to track the proximity distance to the object.

9. The method of claim 8, further comprising, after causing the bypass of filtering:
   determining whether an amplitude of the present signal value is greater than that of the one of the set of immediate, previously detected signal values;
   asserting an enable positive indicator in response to the amplitude of the present signal value being greater than that of the one of the set of immediate, previously detected signal values; and
   asserting an enable negative indicator in response to the amplitude of the present signal value being less than or equal to that of the one of the set of immediate, previously detected signal values.

10. The method of claim 8, wherein, in response to the absolute amplitude difference being less than or equal to the threshold value, the method further comprising:

determining that an enable positive indicator is asserted;
determining that an amplitude of the present signal value is greater than that of an immediate, previously detected signal value; and
causing the bypass of filtering the present signal value.

11. The method of claim 8, wherein, in response to the absolute amplitude difference being less than or equal to the threshold value, the method further comprising:
determining that an enable positive indicator is asserted;
determining that an amplitude of the present signal value is less than or equal to that of an immediate, previously detected signal value; and
causing filtering of the present signal value.

12. The method of claim 8, wherein, in response to the absolute amplitude difference being less than or equal to the threshold value, the method further comprising:
determining that an enable positive indicator is not asserted;
determining that an enable negative indicator is asserted;
determining that an amplitude of the present signal value is less than that of an immediate, previously detected signal value; and
causing the bypass of filtering the present signal value.

13. The method of claim 8, wherein, in response to the absolute amplitude difference being less than or equal to the threshold value, the method further comprising:
determining that an enable positive indicator is not asserted;
determining that an enable negative indicator is asserted;
determining that an amplitude of the present signal value is greater than or equal to that of an immediate, previously detected signal value; and
causing filtering of the present signal value.

14. The method of claim 8, wherein, in response to the absolute amplitude difference being less than or equal to the threshold value, the method further comprising:
determining that an enable positive indicator is not asserted;
determining that an enable negative indicator is not asserted; and
causing filtering of the present signal value.

15. The method of claim 8, wherein, in response to the absolute amplitude difference being less than or equal to the threshold value, the method further comprising:
modeling a recursive filter, which includes one or more low pass filters (LPFs), using a recurrent neural network (RNN) model;
inputting, to the RNN model, a present unfiltered signal value and zero or more previous unfiltered signal values that had been stored in memory;
inputting, to the recursive filter, one or more output of an identity activation function of the RNN model; and
training the RNN model to tune at least one parameter of the recursive filter such as to maximize a signal-to-noise ratio (SNR) of the proximity distance.

16. A method comprising:
causing a capacitive sensing circuit to scan for signal values received via a sensing capacitor of a capacitive sensing system, the signal values associated with a proximity distance to an object;
filtering the signal values through a second order Bessel filter to generate first filtered signal values;
filtering the signal values through an infinite impulse response (IIR) filter to generate second filtered signal values;
selecting, for output signal values, between respective ones of the first and second filtered values depending on whether an absolute amplitude difference between each first filtered signal value and a corresponding second filtered signal value is less than a threshold value; and
employing the output signal values to track the proximity distance to the object.

17. The method of claim 16, further comprising:
determining that the absolute amplitude difference between a first filtered signal value and the corresponding second filtered signal value is greater than or equal to the threshold value;
determining a present signal value as the first filtered signal value minus the corresponding second filtered value plus an immediate previous signal value; and
asserting a store flag to indicate the present signal value has been stored.

18. The method of claim 16, further comprising:
determining that the absolute amplitude difference between a first filtered signal value and the corresponding second filtered signal value is less than the threshold value;
determining that a store flag is asserted to indicate an immediate previous signal value is stored;
retrieving the immediate previous signal value;
deasserting the store flag;
determining a present signal value as the first filtered signal value minus the corresponding second filtered signal value plus the immediate previous signal value; and
storing the corresponding second filtered value.

19. The method of claim 18, further comprising:
determining that the absolute amplitude difference between a subsequent first filtered signal value and a corresponding subsequent second filtered signal value is greater than or equal to the threshold value;
determining a subsequent signal value as the subsequent first filtered signal value minus the corresponding subsequent second filtered value plus the present signal value; and
asserting the store flag to indicate the subsequent signal value has been stored.

20. The method of claim 16, further comprising:
determining that the absolute amplitude difference between a first filtered signal value and the corresponding second filtered signal value is less than the threshold value;
determining that a store flag is deasserted to indicate an immediate previous signal value is not stored;
determining a present signal value as the first filtered signal value minus the corresponding second filtered signal value plus the immediate previous signal value; and
storing the corresponding second filtered value.

* * * * *